United States Patent [19]

Hiramatsu

[11] Patent Number: 4,754,403
[45] Date of Patent: Jun. 28, 1988

[54] HYDRAULIC PRESSURE CONTROL SYSTEM OF AUTOMATIC TRANSMISSIONS FOR VEHICLE

[75] Inventor: Takeo Hiramatsu, Kyoto, Japan

[73] Assignee: Mitsubishi Jidosha Kogyo Kabushiki Kaisha, Tokyo, Japan

[21] Appl. No.: 780,373

[22] Filed: Sep. 26, 1985

[30] Foreign Application Priority Data

Sep. 29, 1984 [JP] Japan ............................... 59-204496

[51] Int. Cl.$^4$ .................. B60K 41/08; F16H 3/74; G05D 15/01
[52] U.S. Cl. .............................. 364/424.1; 74/752 D; 74/865; 74/868
[58] Field of Search ................. 364/424.1; 74/752 A, 74/752 B, 752 D, 865, 866, 867, 868, 869

[56] References Cited

U.S. PATENT DOCUMENTS

| | | | |
|---|---|---|---|
| 4,501,175 | 2/1985 | Tatsumi | 74/869 |
| 4,506,563 | 3/1985 | Hiramatsu | 74/867 |
| 4,513,639 | 4/1985 | Hiramatsu | 74/866 |
| 4,519,273 | 5/1985 | Shimizu et al. | 74/867 |
| 4,538,482 | 9/1985 | Hiramatsu | 74/869 |
| 4,561,328 | 12/1985 | Hiramatsu | 74/869 |

*Primary Examiner*—Felix D. Gruber
*Attorney, Agent, or Firm*—Bierman and Muserlian

[57] ABSTRACT

A hydraulic pressure control system used to reduce the shock associated with the shifting of a vehicular automatic transmission, wherein the speed of the transmission output shaft and the locking element of a planetary gear set are measured, and pressure is applied to said locking element in order to adjust the speed of said element, relative to the output shaft during shifting.

12 Claims, 4 Drawing Sheets

FIG. 3
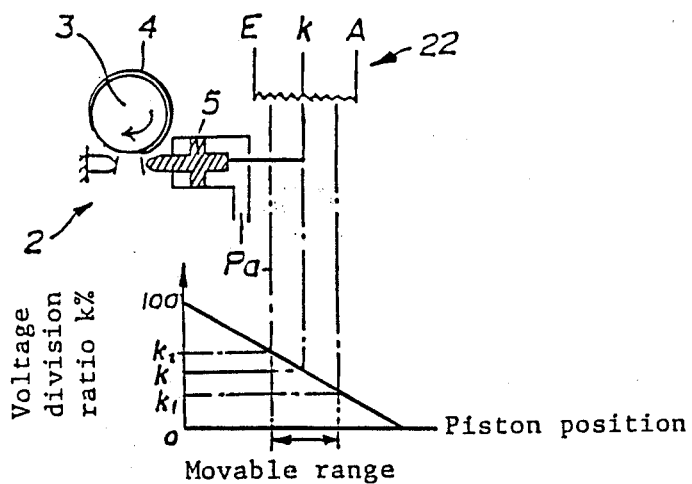
FIG. 4a
FIG. 4b
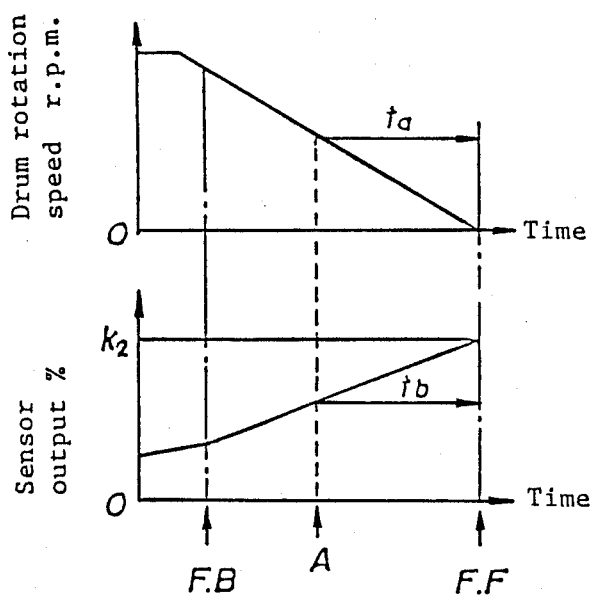

HYDRAULIC PRESSURE CONTROL SYSTEM OF AUTOMATIC TRANSMISSIONS FOR VEHICLE

BACKGROUND OF THE INVENTION

This invention relates to a hydraulic pressure control system of an automatic transmission for a vehicle, in which a plurality of frictional elements are selectively engaged by application of hydraulic pressure so that a plurality of speed ratios can be achieved by a planetary gear set disposed between an input shaft and an output shaft.

BRIEF DESCRIPTION OF THE DRAWINGS

FIG. 3 illustrates the structure and operation of the position sensor 22 employed in the embodiment of the present invention.

FIGS. 4(a) and 4(b) are graphs showing a example how the rotation speed of the kickdown drum and the stroke of the piston 5 change relative to time respectively in the embodiment of the present invention.

DESCRIPTIVE OF THE PRIOR ART

In automatic transmission for a vehicle, hydraulic pressure is selectively supplied to and discharged from frictional elements such as clutches and brakes to couple selected one or several of rotary elements in a change speed gear assembly to an input shaft or to fix such a rotary element or elements relative to the transmission casing, thereby automatically changing over the speed ratio according to the driving conditions of the vehicle. Such a transmission is required to achieve a speed shift with a smallest possible shock in order to protect the apparatus and parts against damage and also to ensure a comfortable ride for occupants.

Figure 1:
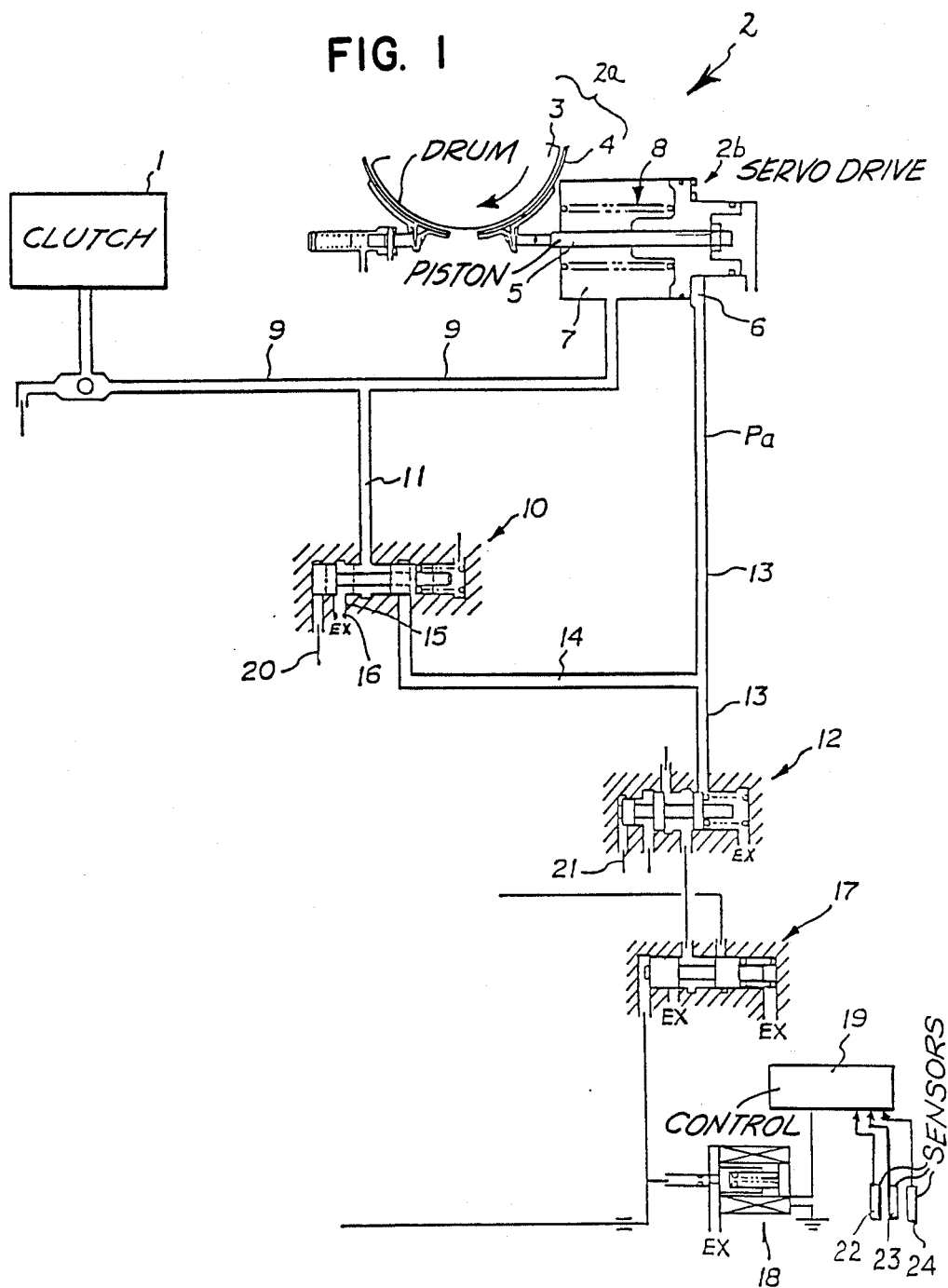
FIG. 1 is a diagrammatic view showing one embodiment of a hydraulic circuit system in an automatic transmission to which the present invention is applied.

One example of a hydraulic pressure control system of an automatic transmission for a vehicle will be described with reference to FIG. 1 which shows a preferred embodiment of the present invention. Referring to FIG. 1, a relatively high speed ratio is achieved when a forward drive clutch (not shown) is engaged to couple one of rotary elements, in a planetary gear type change speed gear assembly(not shown), to an input shaft of the speed change gear assembly and clutch 1 is engaged to couple another rotary element with the input shaft. On the other hand, a relatively low speed ratio is achieved when the clutch 1 is released from engagement, and a kickdown brake (abbreviated hereinafter as a K/D brake) 2 is engaged to lock said another rotary element against rotation.

The structure and the operation of the hydraulic pressure control system shown in FIG. 1 will be described in detail under the definition that the relatively high speed ratio described above refers to a 3rd speed which is a direct drive forward speed ratio, and the relatively low speed ratio described above refers to a 2nd speed. The K/D brake 2 is composed of a frictional element 2a and a servo device 2b. The frictional element 2a comprises a drum 3 connected to a rotary element of the speed change gear assembly and a band 4 wound around the drum 3. The servo device 2b comprises a piston 5 engageable with the band 4 for fastening or releasing the band 4 to or from the drum 3, an engaging side hydraulic pressure chamber 6 and a releasing side hydraulic pressure chamber 7 defined on both sides of the piston 5, and a spring 8 normally urging the piston 5 in the direction which the band 4 is released. When the drum 3 is fastened by the band 4, the drum 3 is fixed or locked against rotation relative to the casing of the automatic transmission. The clutch 1 is so constructed that it is engaged when hydraulic pressure is supplied to a hydraulic pressure chamber (not shown), and it is released by the force of a spring (not shown) when the hydraulic pressure is exhausted from said chamber. This clutch 1 is disposed between an output shaft of a torque converter (not shown) (the input shaft of the change speed gear assembly) and the drum 3 of the K/D brake 2 (i.e. the rotary element connected to the drum 3) so as to couple and release the former to the latter. The hydraulic pressure chamber of the clutch 1 communicates with the releasing side hydraulic pressure chamber 7 of the servo device 2b through an oil passage 9, and said oil passage 9 communicates with a 2-3 shift valve 10 through an oil passage 11. A 1-2 shift valve 12 communicates with the engaging side hydraulic pressure chamber 6 of the servo device 2b through an oil passage 13 and also with the 2-3 shift valve 10 through an oil passage 14. The 2-3 shift valve 10 is switched over, by hydraulic pressure supplied from a shift control valve (not shown), to permit communication of the oil passage 11 with the oil passage 14 or with an exhaust passage 15. An orifice 16 is provided in the exhaust passage 15 so that the hydraulic pressure from the oil passages 9 and 11 (that is, the hydraulic pressure from the hydraulic pressure chamber of the clutch 1 and that from the releasing side hydraulic pressure chamber 7 of the servo device 2b) may not be abruptly exhausted. A hydraulic pressure control valve 17 controls hydraulic pressure supplied to the hydraulic pressure chamber of the clutch 1 and to the both hydraulic pressure chamber 6 and 7 of the servo device 2b through the 1-2 and 2-3 shift valves 12 and 10. The 1-2 shift valve 12 is switched over by the hydraulic pressure supplied from the shift control valve (not shown), to supply the hydraulic pressure from the hydraulic pressure control valve 17 to the oil passage 13 or other oil passage. An electromagnetic valve 18 controls signal hydraulic pressure supplied to the hydraulic pressure control valve 17 by suitably discharging the signal hydraulic pressure. This electromagnetic valve 18 is duty-controlled by an electronic control device 19. For the purpose of switch-over control of the 2-3 and 1-2 shift valves 10 and 12, hydraulic pressure is supplied through oil passages 20 and 21 to act upon these valves respectively. The shift control valve is disposed in an oil passage communicating with said oil passages 20 and 21, and the position of the shift control valve is controlled by another electromagnetic valve (not shown) by the electronic control device 19 on the basis of the results of detection of operation parameters such as a running speed of the vehicle and an opening degree of the throttle valve of the engine. The value of hydraulic pressure supplied to the hydraulic pressure chamber of the clutch 1 and to both of the two hydraulic pressure chambers 6 and 7 of the servo device 2b applied through the hydraulic pressure control valve 17 is controlled by the signal hydraulic pressure acting upon the hydraulic pressure control valve 17 which is controlled by the duty-controlled electromagnetic valve 18.

The structure and operation of an automatic transmission control system as described above are disclosed in greater detail in U.S. patent application Ser. Nos. 433220 and 451385, now issued as U.S. Pat. Nos. 4,538,482 and 4,513,639, respectively, filed earlier by the applicant of the present patent application.

When the vehicle is running at the 3rd speed, hydraulic pressure from the hydraulic pressure control valve 17 is supplied through the 1-2 shift valve 12 and the oil passage 13 to the engaging side hydraulic pressure chamber 6 of the servo device 2b and is also supplied from the oil passage 14 through the 2-3 shift valve 10 to the hydraulic pressure chamber of the clutch 1 and to the releasing side hydraulic pressure chamber 7 of the servo device 2b. When a 3-2 shift signal is generated from the electronic control device 19, the position of the shift control valve is switched over to exhaust the hydraulic pressure from the oil passage 20, and the oil passage 11 communicates with the exhaust passage 15 of the 2-3 shift valve 10, while the oil passage 14 is shut off. As a result, the hydraulic pressure is exhausted from the hydraulic pressure chamber of the clutch 1 and also from the releasing side hydraulic pressure chamber 7 of the servo device 2b, and the hydraulic pressure in the engaging side hydraulic pressure chamber 6 urges the piston 5 leftward in FIG. 1. So the drum 3 of the K/D brake 2 is fastened by the band 4, and the clutch 1 is released and the 2nd speed is achieved.

When the oil passage 11 communicates with the exhaust passage 15 as a result of the switch-over of the 2-3 shift valve 10 during the down shift from the 3rd to the 2nd speed, the hydraulic pressure in the releasing side hydraulic pressure chamber 7 is exhausted instantaneously in spite of the provision of the orifice 16. The hydraulic pressure in the engaging side hydraulic pressure chamber 6 of the servo device 2b progressively urges the piston 5 in the direction in which the drum 3 is fastened by the band 4. On the other hand, the hydraulic pressure in the hydraulic pressure chamber of the clutch 1 would not be exhausted so quickly and is held therein for a certain length of time by being affected by the quick exhausting of the hydraulic pressure from the releasing side hydraulic pressure chamber 7 of the servo device 2b. In other words, the clutch 1 remains in its engaged state for a certain length of time after the 3-2 shift signal has been generated. After complete exhaustion of the hydraulic pressure from the releasing side hydraulic pressure chamber 7, the hydraulic pressure in the hydraulic pressure chamber of the clutch 1 is quickly exhausted to abruptly release the clutch 1. That is, the down shift to the 2nd speed is completed as far as the clutch 1 is concerned. At this time, however, the piston 5 in the K/D brake 2 has not yet completed its full stroke, and the drum 3 is still under rotation. By subsequent completion of the full stroke of the piston 5, the drum 3 is fastened and locked by the band 4 to establish the 2nd speed mode.

Figure 5A:
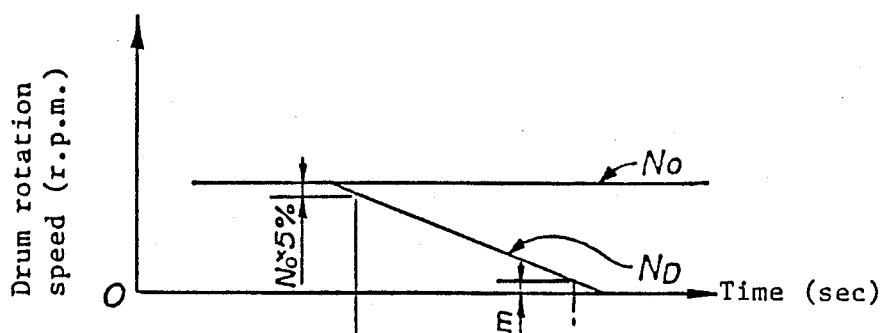
FIGS. 5(a), 5(b), 5(c) and 5(d) are graphs showing how the rotation speed of the kickdown drum, the duty ratio of the electromagnetic valve 18, the output of the position sensor 22 and the torque of the output shaft change relative to time respectively.
Figure 5B:
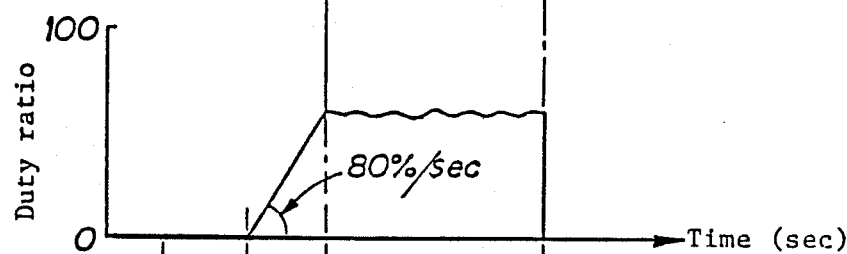
Figure 5C:
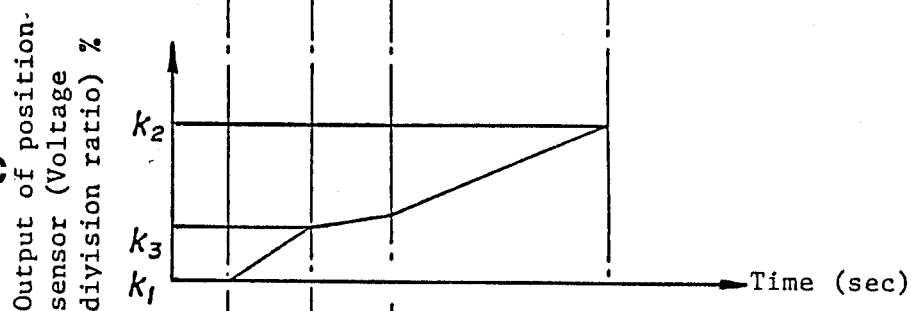
Figure 5D:
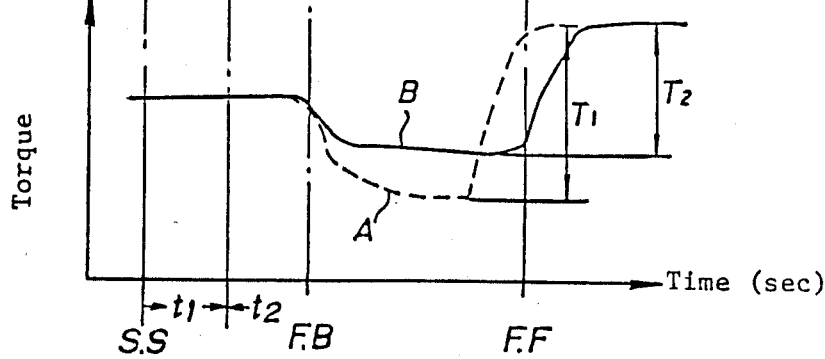

Thus, in the course of the down shift from the 3rd to the 2nd speed, the torque of the output shaft tends to drop considerably as shown by the broken curve A in FIG. 5(d), due to the fact that both the clutch 1 and the K/D brake 2 are released. And because the drum 3 of the K/D brake 2 is completely locked and the 2nd speed is achieved instantaneously after the torque of the output shaft decreases as shown by the curve A, a large torque fluctuation $T_1$ occurs as shown in FIG. 5(d). This large torque fluctuation $T_1$ appears as a large shift shock and is thus undesirable that it gives an uncomfortable feeling to occupants and may be a source of trouble such as damaging a part or parts of the apparatus.

SUMMARY OF THE INVENTION

It is a primary object of the present invention to provide a hydraulic pressure control system for use in an automatic transmission having a structure as described above, which can minimize decrease in the torque resulting in a large shift shock tending to occur during a down shift from a high speed ratio to a low speed ratio.

In accordance with the present invention which attains the above object, there is provided, in an automatic transmission for a vehicle including a planetary gear set achieving a plurality of speed ratios between an input shaft and an output shaft, a frictional element achieving a relatively low speed ratio by locking one of rotary elements of the planetary gear set; servo means including a piston operatively connected to the frictional element and having a first and a second hydraulic pressure chamber formed on both sides respectively of the piston, the piston being moved in the engaging direction of the frictional element when hydraulic pressure is supplied into the first hydraulic pressure chamber, while the piston being moved in the releasing direction of the frictional element when hydraulic pressure is supplied to the second hydraulic pressure chamber; frictional engaging means including a hydraulic pressure chamber communicating through an oil passage with the second hydraulic pressure chamber of the servo means to be engaged when the hydraulic pressure is supplied into the chamber thereby achieving a relatively high speed ratio; shift valve means for selectively supplying or exhausting the hydraulic pressure into or out of the oil passage; orifice means disposed in an exhaust passage communicating with the shift valve means; electrical hydraulic pressure control means for controlling the hydraulic pressure supplied to the first hydraulic pressure chamber of the servo means; position sensing means for detecting the position of the piston of the servo means; rotation speed sensing means for detecting the rotation speed of the rotary element; and electronic control means for applying a control signal to the electrical hydraulic pressure control means in response to the output signals from the individual sensing means, the hydraulic pressure supplied to the first hydraulic pressure chamber of the servo means during a speed shift from the relatively high speed ratio to the relatively low speed ratio being so controlled that the timing when the rotation of the rotary element stops coincides substantially with the timing when the piston of the servo means, completes it full stroke.

DESCRIPTION OF THE PREFERRED EMBODIMENT

A preferred embodiment of the hydraulic pressure control system according to the present invention will now be described in detail with reference to FIGS. 1 to 5. The solid curves shown in FIGS. 5(a), 5(b), 5(c) and 5(d) illustrate how the rotation speed $N_D$ of the drum 3, the duty ratio of the electromagnetic valve 18, the output of a position sensor 22, and the torque of the output shaft change relative to time respectively in the embodiment of the present invention to be described below.

Also in FIG. 5, the symbols S.S, F.B and F.F indicate the timing when a speed shift signal is generated, the timing when feedback control begins and the timing when the feedback control terminated, respectively.

The structure of the embodiment of the present invention differs from that of the prior art system already described above in that a position sensor 22, a drum rotation speed sensor 23 and a vehicle speed sensor 24 are additionally provided. The position sensor 22 includes a variable resistor for detecting the position of the piston 5 of the servo device 2b as shown in FIG. 3. The variable resistor is connected to a power source at a terminal E and grounded at another terminal A. The drum rotation speed sensor 23 detects the rotation speed $N_D$ of the drum 3. The vehicle speed sensor 24 detects the running speed of the vehicle represented by the rotation speed $N_o$ of the output shaft of the automatic transmission. Detection output signals from these sensors 22, 23 and 24 are applied to the electronic control device 19, and the electronic control device 19 controls a speed shift and also controls the hydraulic pressure during such a speed shift in a manner as already described.

Figure 2:
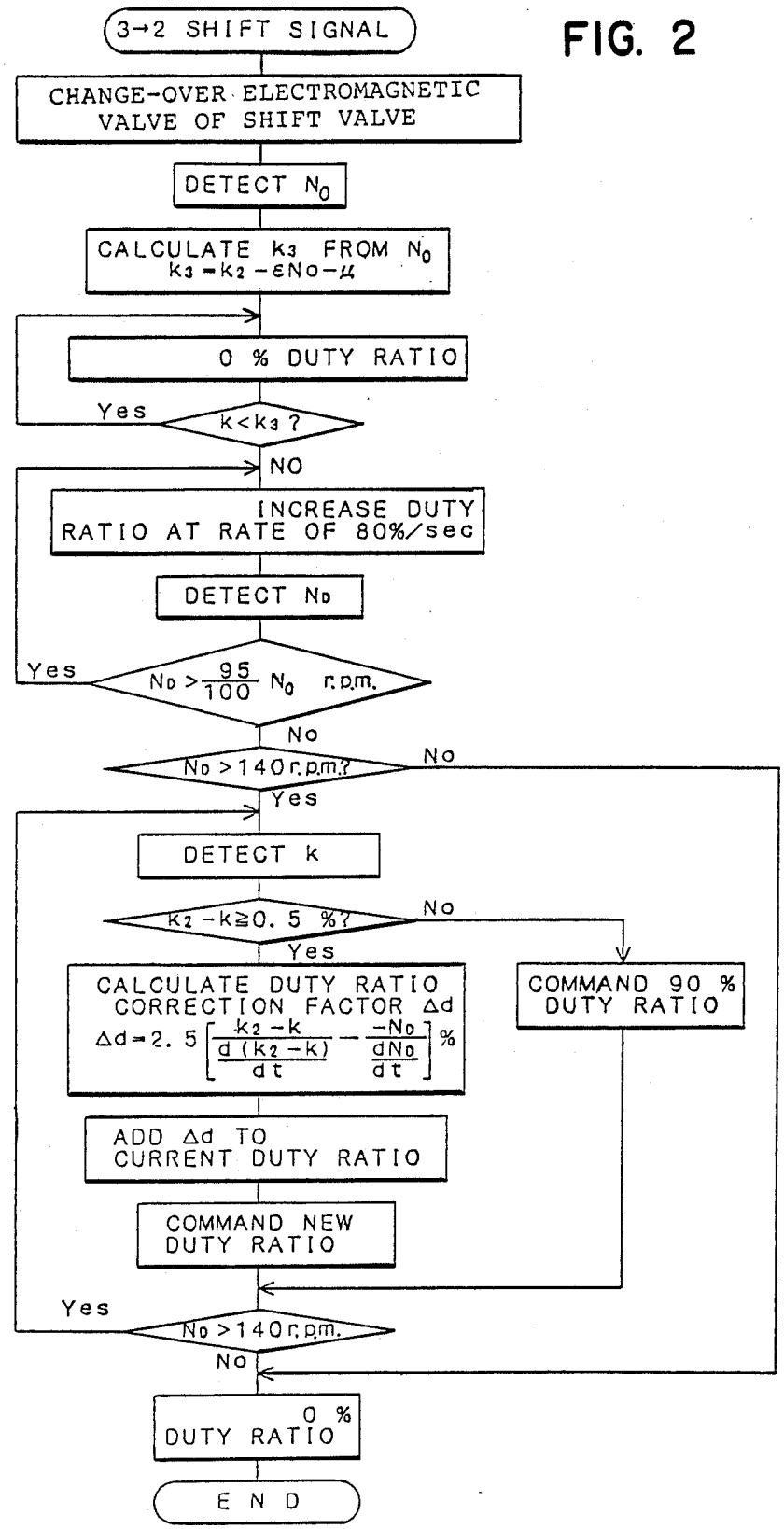
FIG. 2 is a flow chart showing the steps of control executed in an embodiment of the hydraulic pressure control system according to the present invention.

The mode of controlling a down shift from a 3rd speed to a 2nd speed according to the embodiment of the present invention will be described with reference to a flow chart shown in FIG. 2.

When a shift signal for the down shift from the 3rd speed to the 2nd speed is generated from the electronic control device 19 according to the driving conditions of the vehicle, the position of the shift control valve (not shown) is switched over to exhaust the hydraulic pressure in the oil passage 20, and the 2-3 shift valve 10 is shifted to the 2nd-speed position where the oil passage 11 communicates with the exhaust passage 15. Then, the vehicle speed (=the rotation speed of the transmission output shaft) $N_o$ is detected by the vehicle speed sensor 24, and to determine the starting timing of decreasing the hydraulic pressure Pa supplied to the engaging side hydraulic pressure chamber 6 of the servo device 2b on the basis of the detected vehicle speed $N_o$, a voltage division ratio $k_3$ of the variable resistor of the position sensor 22 is calculated. The calculating formula is as follows:

$$k_3 = k_2 - \epsilon N_o - \mu \quad (1)$$

As shown in FIG. 3, the voltage division ratio k corresponds to the stroke of the piston 5 operatively connected to the 6 and 4 of the K/D brake 2, and $k_1$ and $k_2$ represent the zero stroke and the full stroke of the piston 5 respectively. In the calculating formula (1), $\epsilon$ and $\mu$ are positive constants. The value of $k_3$ (which represents the starting position for decreasing the hydraulic pressure) changes relative to the vehicle speed. Therefore, it will be seen from the equation (1) that the length of time required for the piston 5 to reach the hydraulic-pressure decreasing starting position $k_3$, that is, the period of time elapsed until the hydraulic pressure starts to decrease after the generation of the shift signal, changes depending on the speed of the vehicle.

Then, in order to increase the hydraulic pressure in the engaging side hydraulic pressure chamber 6 of the servo device 2b, the electromagnetic valve 18 is controlled or commanded to operate at a duty ratio of 0%, and the piston 5 is quickly moved until the voltage division ratio k (the output of the position sensor 22) attains the value of $k_3$. As a result of the above movement of the piston 5, the band 4 is moved to a position at which it is about to engage with the drum 3 (the position immediately before the initial engagement is made).

Subsequently, the voltage division ratio $k_3$ indicative of the calculated position for starting to decrease the hydraulic pressure is compared with the voltage division ratio k indicated by the output of the position sensor 22. When the result of the comparison proves that k is smaller than $k_3$, that is, when the piston 5 has not yet reached the hydraulic-pressure decreasing starting position, application of the command signal commanding the duty ratio of 0% continues.

On the other hand, when the result of comparison proves that k becomes larger than $k_3$, that is, when the piston 5 has moved beyond the hydraulic-pressure decreasing starting position, the duty ratio of the electromagnetic valve 18 is controlled or commanded to increase along a gradient of 80%/sec, with the result that the hydraulic pressure Pa is rapidly decreased.

Then, the rotation speed $N_D$ of the drum 3 of the K/D brake 2 is detected by the drum rotation speed sensor 23, and judgment is made as to whether or not the detected rotation speed $N_D$ shows a decrease of 5% or more relative to the detected rotation speed $N_o$ of the transmission output shaft. When the result of judgment is "YES", it indicates that the K/D brake 2 is now in a state of initial engagement. This judgment is based on the fact that there is no change in the vehicle speed during a speed shift. On the other hand, when the result of judgment proves that the detected rotation speed $N_D$ of the drum 3 does not show a decrease of 5% or more relative to the detected rotation speed $N_o$ of the transmission output shaft, application of the command signal commanding the increase in the duty ratio (hence, the decrease in the hydraulic pressure) continues.

After the detected rotation speed $N_D$ of the drum 3 is judged that is shows a decrease of 5% or more relative to the detected rotation speed $N_o$ of the transmission output shaft, judgment is made as to whether or not the drum rotation speed $N_D$ is higher than 140 r.p.m. When the result of judgment is "No" although such a case would not be usually encountered except for accidental occurrence of system failure or breakdown, that is, when the drum rotation speed $N_D$ has become lower than 140 r.p.m. due to such a trouble, the electronic control device 19 causes to cancel all of the later steps of control and generates a command signal commanding a duty ratio of 0% to increase the hydraulic pressure thereby fastening and locking the drum 3 by the band 4. Such a procedure is taken so as to prevent the occurrence of accidental system failure or breakdown resulting in impossibility of achievement of the desired speed shift.

The above mode of control of the hydraulic pressure Pa shifts to a feedback control mode after the drum rotation speed $N_D$ has been proved to be decreased by 5% or more relative to the rotation speed $N_o$ of the transmission output shaft, that is, after the K/D drum 2 is placed in the state of initial engagement, and also after the drum rotation speed $N_D$ is judged to be higher than 140 r.p.m. In this feedback control mode, the electronic control device 19 executes feedback control of the hydraulic pressure Pa supplied to the engaging side hydraulic pressure chamber 6 of the servo device 2b, while detecting both the rotation speed $N_D$ of the drum 3 and the output (the voltage division ratio) k of the position sensor 22, so that the timing when the rotation of the drum 3 stops coincides with the timing when the piston 5 completes its full stroke. A duty ratio correction factor Δd used for correcting the duty ratio d in one cycle of feedback control is calculated according to the following basic calculating formula:

$$\Delta d = 2.5 \left[ \frac{k_2 - k}{\frac{d(k_2 - k)}{dt}} - \frac{-N_D}{\frac{dN_D}{dt}} \right] \% \quad (2)$$

The manner of correction of the duty ratio according to the equation (2) will be described with reference to FIGS. 4(a) and 4(b) which are graphs showing how the rotation speed $N_D$ of the drum 3 and the output k of the position sensor 22 change relative to time. In FIGS. 4(a) and 4(b), the symbols F.B and F.F indicate the starting timing and terminating timing respectively of the feedback control.

The member $$\frac{-N_D}{\left(\frac{dN_D}{dt}\right)}$$

in the equation (2) represents an estimated length or time ta that will elapse until $N_D$ is decreased to $N_D=0$ r.p.m. from a selected point A on the time axis. Also, the member $$\frac{k_2 - k}{\left[\frac{d(k_2 - k)}{dt}\right]}$$

represents an estimated length of time tb that will elapse until k becomes equal to $k=k_2$ (%). Since it is the purpose of the feedback control to attain coincidence between the timing of when the rotation of the drum 3 stops and the timing when the piston 5 completes its full stroke, the duty ratio is to be corrected in such a manner as to attain the relation ta=tb. Therefore, the manner of correction of the duty ratio is preferably such that the duty ratio is corrected in the positive and negative directions when the relation between ta and tb at the point A is ta>tb and ta<tb, respectively. That is, the hydraulic pressure is to be decreased when the relation ta>tb is realized, and increased when the relation ta<tb is realized. On the other hand, the duty ratio is not to be corrected when the relation between ta and tb at the point A is ta=tb.

After the duty ratio has been corrected once in the above step, judgment is made as to whether or not the rotation speed $N_D$ of the drum 3 is higher than 140 r.p.m. And if the result of judgment proves that $N_D$ is still higher than 140 r.p.m, feedback control of the above manner is repeated until $N_D$ becomes equal to or lower than 140 r.p.m. And if the relation $N_D=140$ r.p.m. is judged, the drum 3 is brought to a halt, and the duty ratio is immediately decreased to 0% thereby quickly increasing the hydraulic pressure Pa. Thus, the piston 5 completes its full advancing stroke, and the drum 3 is fastened by the belt 4 and locked against rotation.

When the relation $k_2-k<0.5$ (%) is detected in the course of the feedback control regardless of the fact that $N_D$ is higher than 140 r.p.m, that is, when the detected position of the piston 5 is almost at its full stroke, the electronic control device 19 generates a command signal commanding a duty ratio of 90% thereby decreasing the hydraulic pressure Pa temporarily, so that the K/D brake 2 may not be abruptly engaged without the corresponding to the decrease in the rotation speed $N_D$ of the drum 3. Therefore, the command signal commanding the duty ratio of 90% is generated continuously as long as the relation $k_2-k<0.5$ (%) continues, until the relation $k_2-k\geq 0.5$ (%) is finally attained. When the relation $K_2-k\geq 0.5$ (%) is attained, the feedback control is repeated again. However, when the rotation speed $N_D$ of the drum 3 becomes equal to or lower than 140 r.p.m. although the relation $k_2-k<0.5$ (%) is still maintained, the electronic control device 19 generates a command signal commanding the duty ratio of 0% to increase the hydraulic pressure Pa thereby achieving the speed shift.

The piston 5 will delay to complete its full stroke compared to the complete halting of the drum 3 due to a delayed in response of the hydraulic circuit system, if a command signal commanding the duty ratio of 0% is generated to increase the hydraulic pressure after attainment of $N_D=0$ r.p.m. is detected in the course of the feedback control. In the present invention, therefore, the decrease in the drum rotation speed $N_D\leq 140$ r.p.m. is detected to cause increase the hydraulic pressure so as to cancel the delayed response of the hydraulic circuit system.

As described above, the hydraulic pressure Pa supplied to the engaging side hydraulic pressure chamber 6 of the K/D brake 2 is controlled to cause gradual discharge of the hydraulic pressure from the hydraulic pressure chamber of the clutch 1 thereby gradually releasing the clutch 1. Further, since the clutch 1 is released in concurrent relation with the engagement of the K/D brake 2, an undesirable situation would not occur in which the two frictional elements are both released. Therefore, the dropping rate of the torque of the output shaft is less than hitherto as shown by the solid curve B in FIG. 5(d), and, as a result, the torque fluctuation $T_2$ at the end of the speed shift is less than torque fluctuation $T_1$ of the prior art.

Further, it is apparent from the equation (1) that the control system embodying the present invention is so constructed that the start timing of decreasing the hydraulic pressure (the position of the piston 5 where the hydraulic-pressure decreasing starts, hence, the voltage division ratio $k_3$ of the position sensor 22) is changed depending on the vehicle speed (=the rotation speed $N_o$ of the transmission output shaft), and the manner of feedback control is such that the higher the vehicle speed, the voltage division ratio $k_3$ becomes smaller thereby expediting timing when decreasing of the hydraulic-pressure starts. In other words, the period of time $t_1$ in FIG. 5(d) is shortened to correspondingly extend the period of time required for an effective speed shift, so that the torque fluctuation is minimized. At the 3rd speed, the drum 3 is rotating in a direction as shown by the arrow in FIGS. 1 and 3, that is, in a direction which the drum 3 itself imparts a fastening force to the band 4. Therefore, when the vehicle speed is high, that is, when the rotation speed $N_D$ of the drum 3 is high, the band fastening action will act even when the band 4 only slightly touches the drum 3, and this may result in a possibility that execution of the later steps of feedback control becomes impossible. To avoid such an objectionable situation, it is preferable to start decreasing the hydraulic pressure from a time when the stroke of the piston 5 is not so large when the vehicle speed is high. By doing so, the resultant shift shock can also be minimized.

It will be understood from the foregoing detailed description that the hydraulic pressure control system for an automatic transmission according to the present invention can reduce the torque drop during a speed shift from a high speed ratio to a low speed ratio thereby minimizing the torque fluctuation and greatly alleviating the shift shock. Further, the control system is constructed to change the starting of hydraulic pressure control depending on the vehicle speed, so that the shift shock that may be imparted at a high vehicle speed can be greatly alleviated.

What is claimed is:

1. In an automatic transmission for a vehicle having a planetary gear set for achieving a plurality of speed ratios between an input shaft and an output shaft, a hydraulic pressure control system including:
    a first frictional engaging element for achieving a relatively low speed ratio by locking a first rotary element of said planetary gear set;
    a second frictional engaging element for achieving a relatively high ratio by locking a second rotary element of said planetary gear set;
    servo means comprising a first piston operatively connected to said first frictional engaging element, and a first and second hydraulic pressure chamber formed on both sides of said first piston, said first piston being moved in the engaging direction of said first frictional engaging element, when hydraulic pressure is supplied to said first hydraulic pressure chamber, and said first piston being moved in the releasing direction of said first frictional engaging element when hydraulic pressure is supplied to said second hydraulic pressure chamber;
    actuator means comprising a second piston operatively connected to said second frictional engaging element, and a third hydraulic pressure chamber, communicating with said second hydraulic pressure chamber through an oil passage formed on one side of said second piston, said piston being moved in the engaging direction of said second frictional engaging element when hydraulic pressure is supplied to said third hydraulic pressure chamber;
    shift valve means for selectively supplying and exhausting the hydraulic pressure to and out of said oil passages;
    orifice means disposed in an exhaust passage communicating with said shift valve means;
    electrical hydraulic pressure control means for controlling the hydraulic pressure supplied to said first hydraulic pressure chamber of said servo means;
    position sensing means for detecting the position of said first piston of said servo means;
    rotation speed sensing means for detecting the rotation speed of said first rotary element;
    electronic control means for applying a control signal to said electrical hydraulic pressure control means in response to the output signal from each of said sensing means, for estimating a first length of time required until said first rotary element will be locked from rotation, calculated on the basis of the signal received from said rotation speed sensing means, means for estimating a second length of time required until said first piston completes its full stroke, said time being calculated on the basis of a signal received from said position sensing means, and means for applying a hydraulic pressure corresponding to the difference between said first and second estimated lengths of time, to said first hydraulic pressure chamber so that said first and second estimated lengths of time are equalized.

2. A hydraulic pressure control system as claimed in claim 1 wherein said first estimated length of time required until said first rotary element will be locked is calculated on the basis of the rotation speed of said first rotary element detected at an arbitrarily selected time and a differentiated value of said detected rotation speed during the speed shift, while said second estimated length of time required until said first piston completes its full stroke is calculated on the basis of the distance between the position of said first piston detected and its full stroke position and differentiated value of the detected distance at said arbitrarily selected time.

3. A hydraulic pressure control system as claimed in claim 1, further comprising vehicle speed detecting means for detecting running speed of the vehicle whereby the electronic control means operates to control the starting timing and start to control the hydraulic pressure supplied to said first hydraulic pressure chamber of said servo means to change depending on the detected running speed of the vehicle.

4. A hydraulic pressure control system as claimed in claim 3, wherein said control starting timing is represented by a specific position of said first piston of said servo means.

5. A hydraulic pressure control system as claimed in claim 4, wherein the specific position of said first piston representing said control starting timing is determined on the basis of the running speed of the vehicle detected at shift starting time, and a predetermined hydraulic pressure is supplied to said first hydraulic pressure chamber of said servo means until said first piston reaches said specific position immediately after the speed shift is started.

6. A method of controlling speed ratios of a vehicular automatic transmission by selectively locking and unlocking a rotary element of a planetary gear set comprising
    determining the necessity of a transmission downshift,
    generating a signal to downshift from a higher speed ratio to a lower speed ratio,
    detecting the rotational speed representing that of said rotary element,
    detecting a stroke position of a servo piston of a hydraulic control system,
    determining the starting time for the adjustment of hydraulic pressure within said hydraulic control system,
    calculating a first estimated time required to selectively lock a first or second rotary element of the planetary gear set,
    calculating a second estimated time for the servo piston of the hydraulic control system to complete its stroke,
    comprising said first and second estimated lengths of time,
    initiating a changeover in the position of a shift control valve to relieve hydraulic pressure within the oil passages connected to said rotary element in response to said signal, adjusting the hydraulic pressure acting upon said rotary element of the planetary gear set so that said first and second estimated times are equalized, whereby shock associated with transmission downshifting is reduced.

7. The method of claim 6 wherein the time between the generation of a shift signal and the adjustment of hydraulic pressure changes depending upon the speed of the vehicle.

8. The method of claim 6 wherein the hydraulic pressure of said hydraulic control system is adjusted in response to a predetermined decrease in the rotational speed of said rotary element of said plantary gear set relative to the rotational speed representing that of said rotary element just before the starting of the downshift.

9. The method of claim 6 wherein all further steps of controlling the hydraulic pressure in said hydraulic control system are canceled when the rotational speed of said rotary element of said planetary gear set is below a predetermined rotational speed.

10. The method of claim 9 wherein the predetermined rotational speed is about 140 RPM.

11. The method of claim 6 wherein hydraulic pressure acting upon said rotary element of said planetary gear set is adjusted only when the calculated difference between the position of said servo piston of the hydraulic control system and the position of said servo piston at its completed stroke is greater or equal to a predetermined value.

12. The method of claim 11 wherein said predetermined value is about 0.5%.

* * * * *